United States Patent [19]

Leigh et al.

[11] Patent Number: 5,121,365

[45] Date of Patent: Jun. 9, 1992

[54] CUTTING SOUND ENHANCEMENT SYSTEM FOR MINING MACHINES

[75] Inventors: Michael C. Leigh, Coal Center; August J. Kwitowski, Clairton, both of Pa.

[73] Assignee: The United States of America as represented by the Secretary of the Interior, Washington, D.C.

[21] Appl. No.: 645,430

[22] Filed: Jan. 24, 1991

[51] Int. Cl.⁵ .............................................. G01S 3/80
[52] U.S. Cl. .................................... 367/118; 367/135
[58] Field of Search ....................... 367/13, 135, 118; 175/50

[56] References Cited

U.S. PATENT DOCUMENTS

| | | | |
|---|---|---|---|
| 2,396,935 | 3/1946 | Walstrom | 367/25 |
| 4,649,524 | 3/1987 | Vance | 367/13 |
| 4,751,418 | 6/1988 | Murase | 381/190 |
| 4,903,245 | 2/1990 | Close et al. | 367/81 |

*Primary Examiner*—Daniel T. Pihulic
*Attorney, Agent, or Firm*—E. Philip Koltos

[57] ABSTRACT

A cutting sound enhancement system (10) for transmitting an audible signal from the cutting head (101) of a piece of mine machinery (100) to an operator at a remote station (200), wherein, the operator using a headphone unit (14) can monitor the difference in sounds being made solely by the cutting head (101) to determine the location of the roof, floor, and walls of a coal seam (50).

7 Claims, 1 Drawing Sheet

CUTTING SOUND ENHANCEMENT SYSTEM FOR MINING MACHINES

TECHNICAL FIELD

The present invention relates to the field of acoustical monitoring in a mining environment in general, and in particular to a system for focusing an acoustical transducer on the cutting head of a mining machine and coupling the output of the transducer to headphones worn by the remotely positioned operator of the machine to assist the operator in audibly detecting the location of the parameters of a coal seam.

BACKGROUND ART

As can be seen by reference to the following U.S. Pat. Nos. 4,903,245; 4,751,418; 2,396,935; and 4,649,524; the prior art is replete with myriad and diverse acoustical monitoring systems and electroacoustic transducers.

While all of the aforementioned prior art constructions are more than adequate for the basic purpose and function for which they have been specifically designed, these patented systems have never before been employed in the specific environment or in the same way as proposed in the present invention.

In the past attempts had been made to acoustically monitor mining equipment with microphones to ascertain by the deviations in noise levels when the cutting head of a miner was encountering rock or coal. Unfortunately the ambient sounds of the conveyor, hydraulic pump, ventilation system and other noise sources masked the cutting sounds and did not produce reliable results that could be depended upon by the machine operator situated at a remote location.

In one instance a longwall shearer was equipped with a sensitized pick which responded to instantaneous changes in cutting force. However a computer was coupled to the output of the pick and was unable to detect successfully contact between the shearer and the rock roof above the seam of coal.

As a consequence of the foregoing situation, there has existed a longstanding need in the mining industry to provide the machine operator with cutter head vibration information on a real time basis via an audio system; and, the provision of such a construction is a stated objective of the present invention.

DISCLOSURE OF THE INVENTION

Briefly stated, the cutting sound enhancement system for mining machines which forms the basis of the present invention comprises an electroacoustic transducer mounted on the cutting head of a mining machine; wherein, the output of the transducer is acoustically coupled to earphones worn by the machine operator.

In this manner the operator not only gains a feeling of physical connection to the machinery which is situated at a remote location; but, the acoustical output from the transducer isolates the vibrations emanating from the cutting head such that the operator is able to audibly sense the difference in the output when the cutting head contacts either the roof, walls, or sides of the coal seam.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
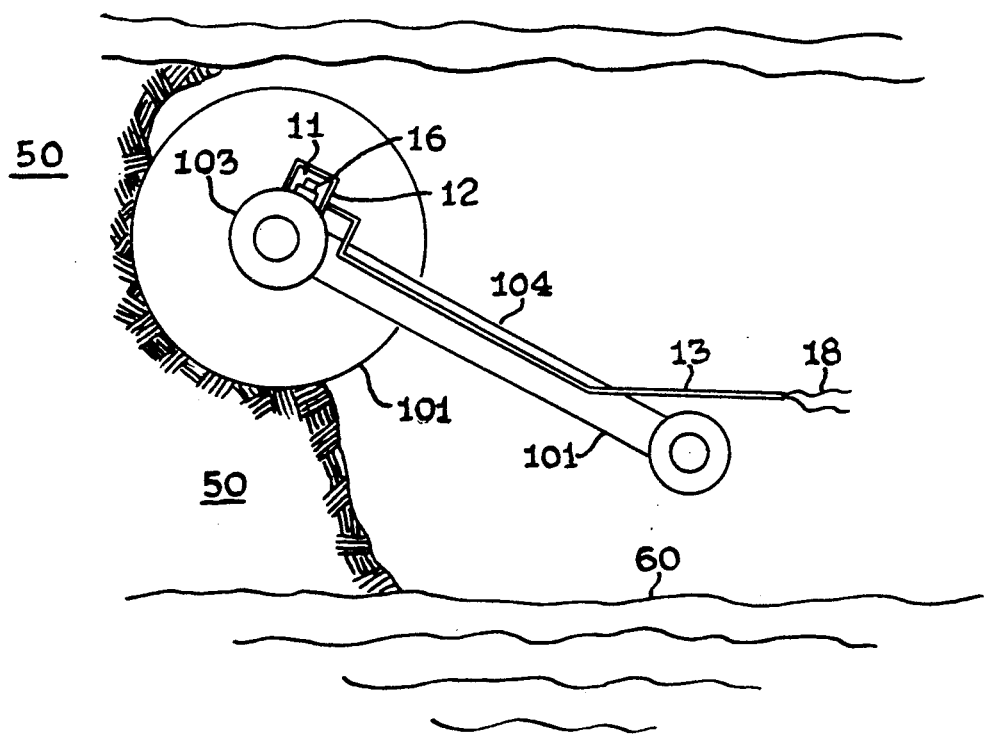
FIG. 1 is a perspective view of the mounting of the transducer unit on the cutting head; and, FIG. 2 is a schematic block diagram of the electrical components employed in the invention.
Figure 2:
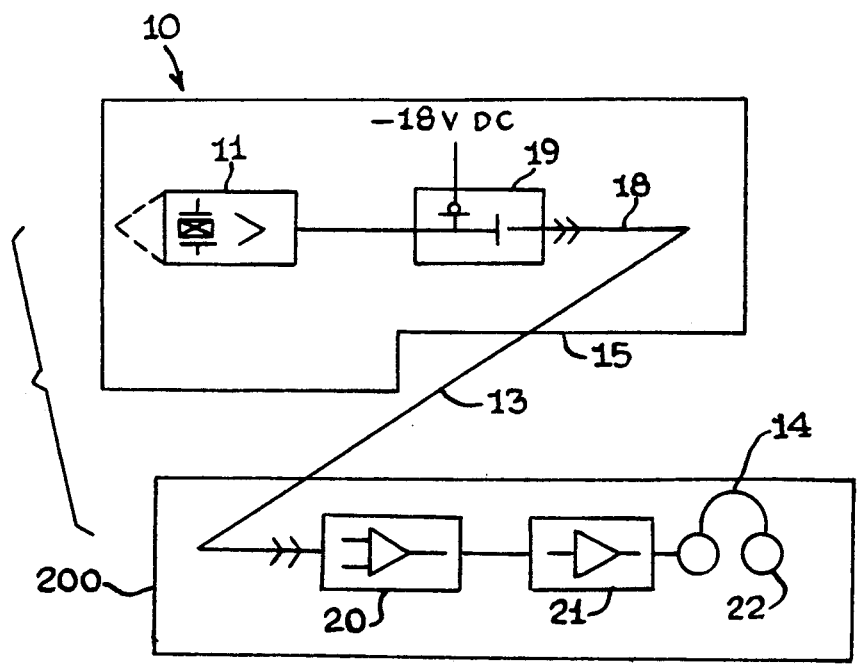

As can be seen by reference to the drawings, and in particular to FIGS. 1 and 2 the cutting sound enhancement system for mining machines that forms the basis of the present invention is designated generally by the reference numeral (10). The system (10) comprises in general: a transducer unit (11) and a housing unit (12) operatively connected to the cutting head (101) on a piece of mining machinery (100); an electrical cable unit (13) operatively connected on one end to the transducer unit (11) and connected on its other end to a headphone unit (14) via an electrical circuit (15), these units will now be described in seriatim fashion.

As shown in FIGS. 1 and 2, the transducer unit (11) comprises a piezoelectric accelerometer (16) with a built in charge amplifier wherein, the accelerometer (16) is operatively attached to the cutter shaft bearing cap (103) of a cutting head (101); and, the transducer unit (11) is covered by the housing unit (12) which protectively surrounds the transducer head (11) on the bearing cap (103) in a well recognized manner.

In addition the transducer unit (11) is operatively coupled to one end of the cable unit (13) which comprises an electrical cable (18) which is attached to a portion of the mining machinery framework (104) such as the ranging arm for the cutter head (101) depicted in FIG. 1.

Turning now to FIG. 2 it can be appreciated that the built in charge amplifier on the accelerometer converts the high impedance signals to low impedance signals suitable for transmission through the cable (18); and, a power conditioner (19) supplies a 4 mA DC current necessary to operate the charge amplifier.

Following the signal transmission on the electrical cable (18) leading to a remote operators station (200); a differential amplifier (20) is used to cancel common mode noise induced on the line; In addition an audio amplifier (21) provides drive and volume control for the headphone unit (14) which consists of a conventional headphone member (22). By mounting the accelerometer on the bearing cap of the mining machine's cutting element as shown in FIG. 1, it is possible to pick-up vibrations related to the cutting activity of the machine. These vibrations are generated by the cutting tools and are transmitted through the mechanical structure of the cutter drum to the accelerometer; wherein, most of the vibrations fall within the audio range of frequencies.

The use of a vibration signal derived from the cutting tool of a mining machine to provide the operator, who may be located remotely, with perceptual feedback on the effect produced by his control inputs is only one of the advantages of the system (10). In addition, the use of this vibration signal, transformed into an audible sound, to clue the mining machine operator that interfaces between different strata have been encountered such as between coal (50), and rock (60).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. A cutting sound enhancement system for use in combination with a cutting head of a piece of mining machinery; wherein, the system comprises:
   a transducer unit mounted on a portion of said cutting head;
   an electrical cable unit operatively secured on one end to said transducer unit; and,
   a headphone unit operatively connected at a remote location to the other end of said cable unit.

2. The system of claim 1; wherein, said transducer unit comprises:
   an accelerometer.

3. The system of claim 2; further comprising: an electrical circuit interposed between said transducer unit and said headphone unit.

4. The system of claim 3; wherein said electrical circuit comprises:
   a power conditioner to operate a charge amplifier in the accelerometer.

5. The system of claim 4; wherein, said electrical circuit further comprises:
   a differential amplifier used to cancel mode noise in the electrical cable unit.

6. The system of claim 5; wherein, said electrical circuit also comprises:
   an audio amplifier to provide drive and volume control for said headphone unit.

7. The system of claim 1; further comprising:
   a housing unit which protectively surrounds the transducer unit on the said cutting head.

* * * * *